Feb. 2, 1932. W. C. HIERING 1,843,557
BAG FRAME FASTENER
Filed Oct. 15, 1930
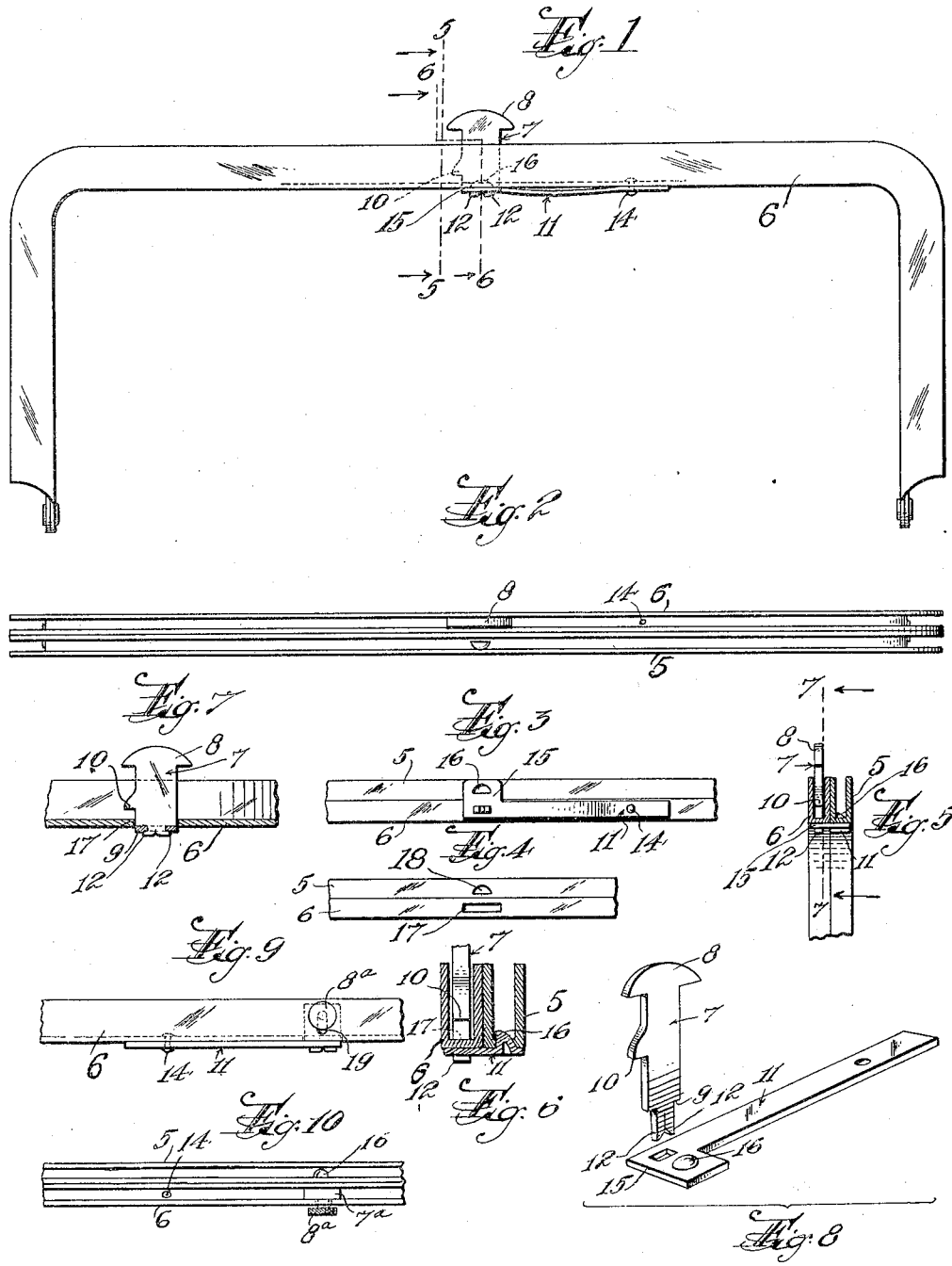

Patented Feb. 2, 1932

1,843,557

UNITED STATES PATENT OFFICE

WILLIAM C. HIERING, OF NEWARK, NEW JERSEY, ASSIGNOR TO J. E. MERGOTT CO., OF NEWARK, NEW JERSEY, A CORPORATION OF DELAWARE

BAG FRAME FASTENER

Application filed October 15, 1930. Serial No. 488,779.

This invention relates to improvements in bag fasteners, and more particularly to that class of bag fasteners adapted to be applied to ladies' hand bags, purses and the like.

The object of my invention is to provide a bag frame fastener consisting of few, simple and rugged parts, susceptible of manufacture economically and rapidly in large quantities, and adapted to be applied to standard U-shaped bag frames.

In carrying out my invention, I secure to the underside of one of the frame members a spring, whose free end is widened and provided with a protuberance adapted to snap into an aperture provided in the mating frame member to secure the frame members together; the protuberance is withdrawn from the aperture of the mating frame member by merely depressing a latch stem secured to the spring, thus disengaging the frame members in a single, simple operation.

These and other advantageous objects, which will later appear, are accomplished by the simple and practical construction and arrangement of parts hereinafter described and shown in the accompanying drawings, forming part thereof, in which:

Fig. 1 represents a side elevational view of a bag frame provided with my improved fastener, Fig. 2 represents a top plan view thereof, Fig. 3 represents a fragmentary bottom plan view of the central portion thereof, Fig. 4 represents a similar view of only the frame members, Fig. 5 represents a transverse sectional view taken on line 5—5 of Fig. 1, in the direction indicated by the arrows, Fig. 6 represents a similar view taken on lines 6—6 of Fig. 1, Fig. 7 represents an elevational view taken on lines 7—7 of Fig. 5, in the direction indicated by the arrows, Fig. 8 represents a perspective view of the latch stem and spring employed in my improved fastener, showing the aperture in the spring to receive the latch stem and the protuberance on the widened end of the spring, which snaps into the aperture of the frame member 5 to latch the frame members together, and Figs. 9 and 10 represent, respectively, side elevational and top plan views of a modified form of my invention applied to a bag frame, shown fragmentarily.

In the drawings, the bag frame is shown to consist of two hinged, U-shaped channelled members 5 and 6, in which the free ends of the cover and lining of the hand bag may be tightly clamped.

My improved fastener consists, essentially, of the latch stem 7, which passes through an aperture 17 in the frame member 6 and is secured to the spring 11 at the underside of the frame member 6 by any suitable means, such as by prongs 12 preferably formed integral with the lower end 9 of the latch stem 7, the latch stem 7 being provided with a nosing 10 adapted to engage with the interior of the frame member 6 adjacent the aperture 17 to prevent excess downward movement thereof.

The spring 11 is secured, at one end, to the frame member 6, by any suitable means, as by pin 14, and is provided at its other, widened end 15, which supports the latch stem 7, with a protuberance 16, adapted to snap into the aperture 18 in the mating frame member 5 to latch the frame members 5 and 6 together.

In operation, to latch the frame members, they are drawn together, and as the frame member 5 is moved towards the frame member 6 the spring-pressed protuberance 16 will have frictional engagement with the underside of the frame member 5 until said protuberance is in alignment with the aperture 18 in the frame member 5, when it will snap into said aperture 18 and securely latch the frame members 5 and 6.

To disengage the frame members, the push-piece 8 is depressed, forcing the protuberance carrying spring 11 downwardly, withdrawing the protuberance from the aperture 18 and allowing the frame members 5 and 6 to be freely opened.

In the modified form of my invention illustrated in Figs. 9 and 10, the push piece 8a of the latch stem 7a protrudes from the side instead of the top of the frame member 6, the latch stem 7a being brought through a slot 19 provided in the side of the frame member 6.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A handbag comprising two frame members of U-shaped cross section hinged together, and a latching member carried by the underside of one of said frame members, comprising a resilient member secured at one end to the frame member and underlying said frame member and provided with a widened free end extending beyond said frame member and adapted to have latching engagement with the other frame member.

2. A handbag comprising two frame members of U-shaped cross section hinged together, an elongated spring member secured at one end to the underside of one of said frame members, said spring member being provided with a widened free end having a latch stem and a protuberance designed to have latching engagement with the other frame member.

This specification signed this 17th day of June, 1931.

WILLIAM C. HIERING.